United States Patent [19]
Paczkowski

[11] 3,846,981
[45] Nov. 12, 1974

[54] EMISSION CONTROL PROCESS AND SYSTEM

[75] Inventor: Michael M. Paczkowski, Nanimo, British Columbia, Canada

[73] Assignee: Nanaimo Enviro Systems, Corp., Seattle, Wash.

[22] Filed: June 4, 1973

[21] Appl. No.: 366,972

Related U.S. Application Data

[63] Continuation of Ser. No. 82,053, Oct. 19, 1970, abandoned, Continuation-in-part of Ser. No. 70,394, Sept. 8, 1970, abandoned.

[52] U.S. Cl. ............... 60/286, 23/277 C, 60/303, 60/282, 60/317
[51] Int. Cl. ............................................. F01n 3/14
[58] Field of Search ............ 60/274, 283, 286, 301, 60/303, 317, 282; 23/277 C

[56] References Cited
UNITED STATES PATENTS

| | | | |
|---|---|---|---|
| 2,857,897 | 10/1958 | Vanderpoel | 60/900 |
| 3,032,968 | 5/1962 | Novak | 60/310 |
| 3,073,684 | 1/1963 | Williams | 60/303 |
| 3,203,168 | 8/1965 | Thomas | 60/286 |
| 3,218,134 | 11/1965 | Walsh | 60/303 |
| 3,228,185 | 1/1966 | Bergstrom | 60/288 |
| 3,495,385 | 2/1970 | Glass | 60/317 |
| 3,581,490 | 6/1971 | Morris | 60/286 |
| 3,599,427 | 8/1971 | Jones | 60/274 |

*Primary Examiner*—Douglas Hart
*Attorney, Agent, or Firm*—Seed, Berry, Vernon & Baynham

[57] ABSTRACT

An emission control system is disclosed for reducing gaseous emissions contained in exhaust gases from combustion processes, whether internal or external. The system is applicable to the exhaust systems of wheeled vehicles, stationary internal combustion engines, diesel engines and external combustion systems. The system is primarily useful in the removal of nitrogen oxides from combustion exhaust gases. The combustion gases containing oxides of nitrogen are contacted with a nitrogen-containing compound or compounds which provide nascent hydrogen, an electron acceptor, resulting in reduction of the oxides of nitrogen. Ammonia, hydrazine, primary, secondary and tertiary amines are exemplary of the compounds which may be used. An oxidation unit is preferably used in conjunction with the system for reduction of oxides of nitrogen to substantially reduce unburned hydrocarbons and carbon monoxide contained in the combustion exhaust gases. Combustion exhaust gases from an internal or external combustion process, containing unburned hydrocarbons, carbon monoxide and oxides of nitrogen, are introduced into an oxidation unit, catalytic or thermal, wherein the unburned hydrocarbons and carbon monoxide are oxidized to carbon dioxide and water. The gases exiting from the oxidation zone are then contacted with a nitrogen-containing compound or compounds which react with the nitrogen oxides. For wheeled vehicles the emission control system is connected to the ignition lock assemkly so that, when the ignition is turned on, the emission control system is activated.

2 Claims, 3 Drawing Figures

MICHAEL M. PACZKOWSKI
INVENTOR.

ATTORNEYS

EMISSION CONTROL PROCESS AND SYSTEM

CROSS REFERENCE TO RELATED APPLICATION

This is a continuation of application Ser. No. 82,053, filed Oct. 19, 1970, and now abandoned.

This application is a continuation-in-part application Ser. No. 70,394, filed Sept. 8, 1970, and now abandoned and entitled "Emission Control Process and Apparatus For Internal Combustion Engine Exhaust Gases."

BACKGROUND OF THE INVENTION

1. Field of the Invention

This invention relates to an emission control system for reducing the amounts of exhaust emissions such as unburned hydrocarbons, carbon monoxide and oxides of nitrogen from combustion exhaust gases.

2. Prior Art Relating to the Disclosure

It is known that internal combustion engines contribute over one-half of the air pollution problem in and around the major urban and suburban areas throughout the world. As pollution laws are becoming more and more stringent ways of reducing the gaseous emissions from exhaust gases of internal combustion engines have been developed. Primary emphasis in the past has been put on ways of reducing and/or removing unburned hydrocarbons and carbon monoxide contaminants from exhaust gases. The catalytic and thermal systems which have been developed to date, however, do not effectively deal with the control of oxides of nitrogen which are believed to play an active part in the formation of "smog."

Thermal oxidation units of various designs are disclosed in the following U.S. Pat. Nos. 2,065,681; 2,147,670; 2,325,543; 3,042,499; 3,073,684; 3,218,134; 3,228,185; and 3,360,927.

To date there has been no practical and efficient means of reducing or substantially eliminating oxides of nitrogen emitted from combustion exhaust gases.

SUMMARY OF THE INVENTION

Combustion exhaust gases containing oxides of nitrogen are contacted with a nitrogen-containing compound or compounds which provide nascent hydrogen under the reaction conditions, the nascent hydrogen reacting with the oxides of nitrogen to reduce them. Unburned hydrocarbons and carbon monoxide contained in the exhaust gases are substantially eliminated by passing the exhaust gases coming directly from the combustion process into an oxidation unit, preferably a thermal unit, wherein the unburned hydrocarbons and carbon monoxide are oxidized to carbon dioxide and water. In particular the emission control system of this invention comprises a high temperature thermal unit including means for feeding air-fuel mixture into the unit and igniting such, means for feeding the combustion exhaust gases directly into a high temperature unit wherein the unburned hydrocarbons and carbon monoxide are oxidized to carbon dioxide and water, means downstream from the high temperature unit for cooling the hot gas stream and means to contact the cooled gases with a nitrogen-containing compound which provides nascent hydrogen under the reaction conditions, the nascent hydrogen reacting with the oxides of nitrogen contained in the gas stream to substantially reduce or eliminate them. Control means connected to the ignition lock assembly of the vehicle are employed to activate the emission control system when employed as a part of the exhaust system on a conventional wheeled vehicle, such as a passenger automobile or truck.

The objects of this invention include the following:

1. to provide a process and system for substantially reducing the amounts of oxides of nitrogen contained in combustion exhaust gases, whether internal or external;

2. to provide a process and system for substantially reducing the amounts of oxides of nitrogen contained in combustion exhaust gases in combination with a thermal or catalytic oxidation unit which is capable of substantially reducing the relative amounts of carbon monoxide and unburned hydrocarbons contained in the combustion exhaust gases;

3. to provide an emission control system for the exhaust gases of internal combustion engines used in wheeled vehicles which does not reduce the available horsepower and performance of the vehicle, which does not create unacceptable backpressure and which can be incorporated on the vehicle as a replacement for the conventional exhaust muffler system at reasonable cost;

4. to provide an emission control system which employs an efficient thermal oxidation unit in conjunction with means for removing oxides of nitrogen from combustion exhaust gases; and 5. to provide an emission control system having control means therewith.

DESCRIPTION OF THE PREFERRED EMBODIMENTS

Figure 1:
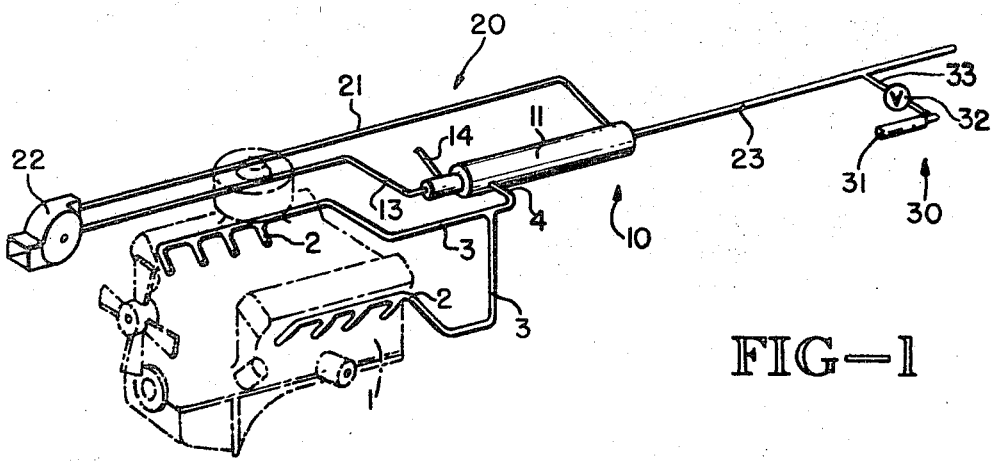
FIG. 1 is a schematic diagram of the emission control system of this invention adapted to replace a portion of the exhaust system of a conventional automobile.

The emission control system of this invention, as shown in FIG. 1, can be designed to fit the exhaust system of wheeled vehicles; however, the concepts and principles involved in the invention are applicable to all combustion processes, whether internal or external.

Oxides of nitrogen are produced in varying amounts during combustion of hydrocarbon-containing fuels such as gasoline, fuel oils, diesel fuel, coal, etc. The high combustion temperatures associated with burning of hydrocarbon fuels in furnaces, internal combustion engines, diesel engines, etc., appear to promote the formation of oxides of nitrogen such as nitrogen dioxide. The oxides of nitrogen contained in combustion exhaust gases can be substantially reduced by contacting them with a nitrogen-containing compound or compounds which provide nascent hydrogen under the reaction conditions, the nascent hydrogen reacting with the oxides of nitrogen to reduce them. Specific nitrogen-containing compounds which may be used include ammonia, hydrazine, and amines having the general formula

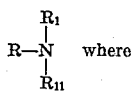

where R is an alkyl radical having one to twelve carbon atoms, an alkene radical having from one to twelve carbon atoms, or an aryl radical and $R_1$ and $R_{11}$ are hydrogen or R. Ammonia is a preferred compound because of its availability, cost and ease of handling. The reaction of the nitrogen-containing compound or compounds apparently yields nitrogen ($N_2$) and water. The optimum reaction temperature varies according to the compound or compounds used. With ammonia the preferred temperature is at least about 275°F. and preferably 275°F. to 900°F. The optimum reaction temperature can be readily determined for a given nitrogen-containing compound or compounds.

Figure 2:
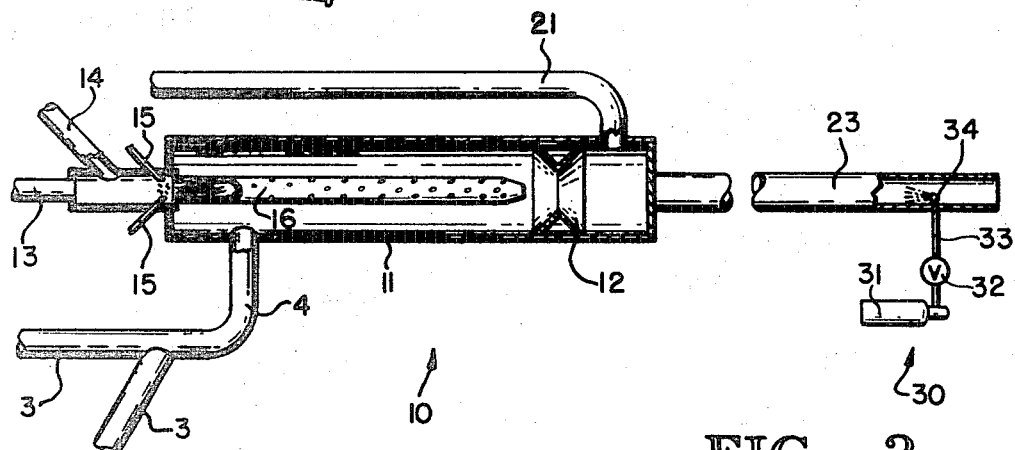
FIG. 2 is a partial cross sectional diagram of the exhaust emission system of FIG. 1.

The system for removal of oxides of nitrogen may be used in conjunction with an oxidation unit for controlling the emissions of internal combustion engines. Referring to FIG. 1 an emission control system for a wheeled vehicle comprises an oxidation unit 10, means 20 for injecting ambient air into the gaseous stream downstream from the oxidation unit and means for contacting the cooled gases with a nitrogen-containing compound or compounds 30. The oxidation unit may be a catalytic or thermal unit. A preferred non-catalytic oxidation unit is illustrated in FIG. 2. Exhaust gases from an internal combustion engine 1 feed through exhaust manifolds 2 into exhaust pipes 3 merging into a common exhaust pipe 4 which feeds into the forward end of oxidation unit 10. The oxidation unit 10 is shown in cross section in FIG. 2 and comprises an outer shell 11 with suitable baffles 12 therein. The interior of the oxidation unit may be baffled as desired to cause the exhaust gases entering the unit through exhaust pipe 4 to be completely oxidized during flow therethrough. At the forward end of tubular shell 11 an air-fuel mixture is introduced through ai conduit 13 and fuel line 14. The air-fuel mixture is ignited by electrodes 15 providing a flame from extending into perforated tube 16, the perforated tube extending into the interior of the outer shell 11. The perforated tube 16 should be fabricated of materials capable of withstanding mechanical and thermal shock and the high temperatures generated in the oxidation unit. Stainless steels, titanium steels, high strength fiber reinforced refractories and ceramic materials may be used. Fuel for the oxidation unit may be provided from the fuel supply 5 of the internal combustion engine or from a separate fuel supply. Air for the oxidation unit is provided by suitable means such as an electrically driven blower 22. Ignition of the air-fuel mixture may be by electrodes 15 powered by the electrical system of the vehicle. The amounts and ratio of air to fuel for combustion in the high temperature unit 10 may be varied as necessary for the particular internal combustion engine and the size of the emission control system. Combustion of the air-fuel mixture entering the high temperature unit through fuel line 14 and air line 13 results in a temperature in the inerier of the high temperature unit ranging from 1,300°F. to 1,900°F. This high temperature in the presence of an excess of oxygen, oxidizes the unburned hydrocarbons and carbon monoxide contained in the exhaust stream entering the high temperature unit through exhaust pipe 4 to carbon dioxide and water vapor.

After oxidation of the unburned hydrocarbons and carbon monoxide contained in the ehxuast gases the gaseous stream may be cooled by cooling means 20 to a predetermined temperature. The most economical means of cooling the gaseous stream is by injection of air having a lower temperature than the gaseous stream downstream from the oxidation unit through pipe 21. Air may be supplied at ambient temperature by an electrically powered blower 22. The gaseous stream, after cooling, is then contacted with the nitrogen-containing compound or compounds to react the nitrogen oxides contained in the exhaust gases therewith. Depending on the location of the injection of the nitrogen-containing compound cooling of the combustion gases may not, be necessary. The nitrogen-containing compound or compounds may be stored in a container 31 and metered through a regulating valve 32 and pipe 33 to nozzle 34, the nozzle being placed in tail pipe 35 of the exhaust system. The placement of the nozzle 34 is dependent on the temperature of the exhaust gases at that point. Valve 32 is preferably of the type which regulates the amount of nitrogen-containing compound entering the nozzle in response to operating conditions of the engine such as the exhaust gas temperature or velocity, operating motor vacuum or in response to the sensor detecting the oxides of nitrogen in the exhaust gases.

Figure 3:
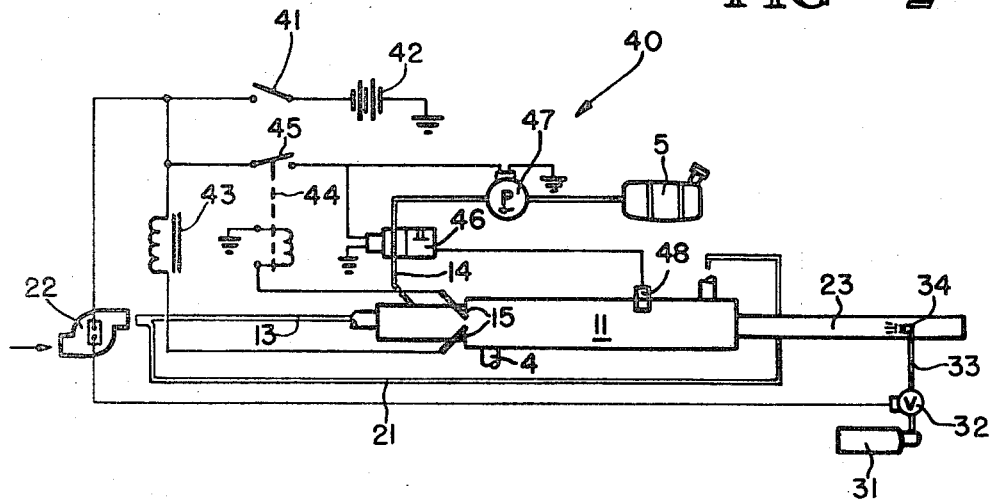
FIG. 3 is a schematic of a control system for activating the emission control system of FIGS. 1 and 2.

A control system for the emission control system shown in FIGS. 1 and 2 is shown in schematic form in FIG. 3. The control system is one developed for incorporation into the electrical system of a conventional passenger car; however, similar concepts may be utilized for trucks and other wheeled vehicles. Reference number 41 indicates the ignition lock assembly of a conventional passenger car when the key is in the "off" position. When the key is turned to the "on" position flow of current from battery 42 through transformer 43 boosts the voltage sufficiently to cause the electric arc across electrodes 15. The current flow through electrodes 15 energizes relay 44 which closes the circuit at 45 allowing current to flow to fuel pump 47 and opening switch 46, permitting a calibrated amount of fuel to flow from fuel tank 5 through fuel line 4 to the combustion zone of the high temperature unit. Closing of switch 41 also activates electrically powered blower 22 and opens regulator valve 32 permitting a calibrated amount of the nitrogen-containing compound to flow through pipe 33 and nozzle 34. A temperature sensing means 48 such as a thermostat or thermocouple having a conventional control associated therewith is provided in the oxidation unit and is directly connected to switch 46 controlling the metering valve in fuel line 14. The controller of the temperature sensor is set to shut off the flow of fuel to the oxidation unit when the temperature reaches a predetermined set point such as, for example, 1,800°F. to 1,900°F. This prevents the temperature from exceeding the critical temperature of the materials of which the oxidation unit is fabricated. Below the set point, switch 46, responsive to the temperature sensor and controller, opens the metering valve in fuel line 14.

With the emission control system described the back pressure on the engine has been found to be less than normal due to air flow through the exhaust system by blower 22. The emssion control system results in more available horsepower and better performance of a conventional internal combustion engine. The cost of the emission control system is reasonable.

The following serves to illustrate the performance of the emission control system of this invention incorporated into the exhaust system of a conventional passenger vehicle, but is not to be considered limiting in any manner.

Example I

A 1968 Pontiac with a 327 cu. inch engine having no emission control system was fitted with the emission control system shown in FIG. 1. Gas analyses were collected at about 3,000 r.p.m. with and without the control system. The analyses were conducted and evaluated by the Environmental Health Division of the University of Washington at Seattle, Washington. The results were as follows:

Table I

| Contaminant | Without Control Device | With Control Device |
|---|---|---|
| Carbon Monoxide | 17,000 ppm | 130 ppm |
| Hydrocarbons | | |
| Methane | 450 ppm | 0 ppm |
| Ethylene | 100 ppm | 2 ppm |
| Nitrogen Dioxide | 37 ppm | 2 ppm |
| Ammonia | Absent | Absent |

A reduction in the amount of carbon dioxide was also noted with the control device. It is believed that nitrogen-containing compounds such as ammonia also react with carbon dioxide under the conditions employed to yield intermediate reaction products.

Although the system described herein has particular utility in controlling the exhaust emissions of internal combustion engines, the system may be utilized to control emissions, such as oxides of nitrogen, from external combustion processes.

The embodiments of the invention in which an exclusive property or privilege is claimed are defined as follows:

1. An emission control system for fitting onto a wheeled vehicle powered by an internal combustion engine for reducing the amounts of unburned hydrocarbons, carbon monoxide and oxides of nitrogen emitted in the exhaust gases, comprising:

a high temperature unit having a non-catalytic combustion zone in the forward end thereof, means for injecting air and fuel in a predetermined ratio into the combustion zone, ignition means in the combustion zone igniting the fuel-air mixture, a first conduit communicating with the forward end of the combustion zone for the introduction of exhaust gases containing unburned hydrocarbons, carbon monoxide and oxides of nitrogen, the unburned hydrocarbons and carbon monoxide being oxidized in the combustion zone to carbon dioxide and water, baffle means in the combustion zone controlling flow of the exhaust gases therethrough, a perforated tubular member within the combustion zone surrounding the flame front resulting from combustion of the air-fuel mixture in the combustion zone, a second conduit communicating with the combustion zone providing an exit for the hot oxidized gases, blower means communicating with the second conduit injecting ambient air into the hot oxidized gases exiting from the combustion zone to cool them, and means injecting regulated amounts of nitrogen-containing compound into the cooled gas stream to react with the oxides of nitrogen, converting them to nitrogen gas and water, said means including (1) a storage vessel for the nitrogen-containing compound, (2) a nozzle positioned in the stream of exhaust gases exiting from the combustion zone, (3) a conduit connecting the nozzle and storage vessel, and (4) valve means regulating the amount of nitrogen-containing compound injected into the exhaust gases through the conduit and nozzle.

2. The emission control system of claim 1 incuding a temperature sensor in the combustion zone of the high temperature unit, a valve controlling fuel flow to the combustion zone of the high temperature unit activated by the temperature sensor, and means controlling the valve means responsive to the the temperature in the combustion zone.

* * * * *